Figure 1:
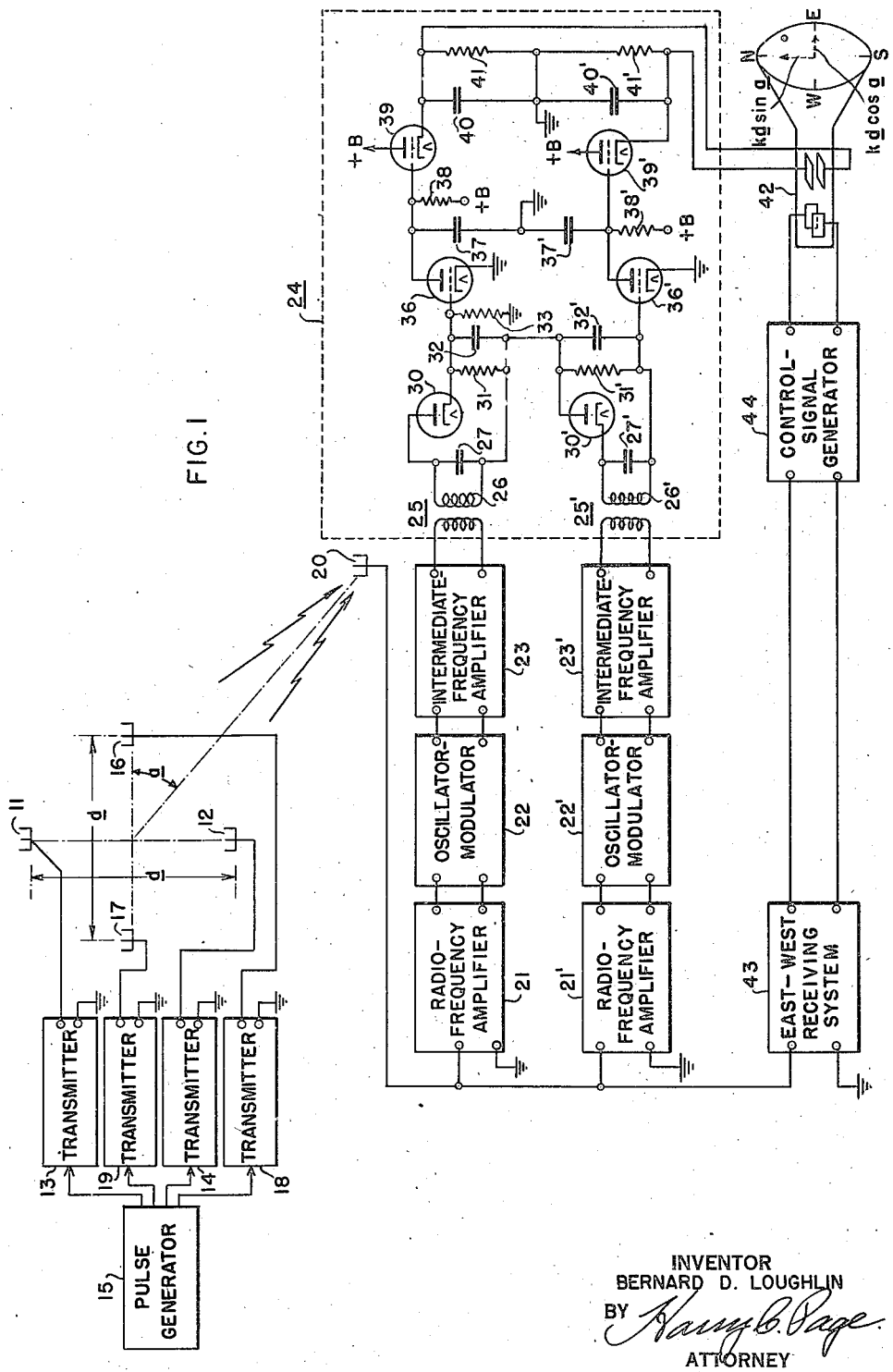

Dec. 31, 1946.　　　　B. D. LOUGHLIN　　　　2,413,637
DIRECTION INDICATING DEVICE
Filed Sept. 15, 1944　　　2 Sheets-Sheet 1

INVENTOR
BERNARD D. LOUGHLIN
BY
ATTORNEY

INVENTOR
BERNARD D. LOUGHLIN
BY
ATTORNEY

Patented Dec. 31, 1946

2,413,637

UNITED STATES PATENT OFFICE 2,413,637

DIRECTION INDICATING DEVICE

Bernard D. Loughlin, Bayside, N. Y., assignor, by mesne assignments, to Hazeltine Research, Inc., Chicago, Ill., a corporation of Illinois Application September 15, 1944, Serial No. 554,233

13 Claims. (Cl. 250—11)

The present invention relates to direction-indicating systems of the type adapted for use as an aid in the navigation of a mobile craft and, particularly, to such systems of the type which utilize spaced wave-signal radiators.

The majority of the prior wave-signal systems utilized as an aid in navigation may be roughly divided into several classes. One class, used largely for marine navigation, is the radio direction-finder system which employs a movable directive receiving antenna, usually of the loop or Adcock type, by which to obtain directional information from signals radiated between the mobile craft and stations of known fixed position. In the absence of knowledge of the general position of the craft from one such station, as might occur during blind flight of any aircraft, two such stations when sufficiently widely spaced furnish sufficient information with the aid of a compass to ascertain position, free from ambiguity, by calculation or by some plotting process. Where compass bearings are not available to a mobile craft or cannot be relied upon, at least three widely spaced stations are necessary for the ascertainment of position of the craft. This system has the disadvantages that it not only requires at least two and possibly three widely spaced systems, but also that it is not in general adapted rapidly and easily to provide desired position indications. Moreover, only one craft can be served at a time by the system.

The prior systems most extensively used in air-craft navigation are of the complementary-signal or equi-signal-locus class, employed with predetermined defined courses. These directional radio beacons, or radio "range" beacons, may be considered direction-indicating systems in the limited sense that the defined courses have predetermined fixed directional relations with a terrestrially located radiating system. Systems of this character are subject to the serious limitation that they may provide indications of but a relatively small number of divergent courses. Additionally, their operation is premised upon received wave-signal intensities which are affected by many factors, such as terrain and atmospheric fading, with the result that this type of system is subject to errors introduced by these extraneous factors.

Other proposed prior art systems have numerous disadvantages and limitations by virtue primarily of the fact that they depend upon the intensity of the received wave-signal energy to provide the direction indications. Thus, any factor affecting the wave-signal intensity, such as unevenness of the terrain surrounding the transmitting antennas or atmospheric fading, seriously impairs the accuracy of the system. Accuracy of indication is likewise impaired by changes of the relative intensities or phases of the wave signals applied to transmitting antenna systems, or by relative changes of the amplitudes or phases of the modulating signals.

It would be desirable that direction indications through 360 degrees, and without ambiguity, be provided by the use of only one station of fixed location. It would further be desirable that the system be one of the pulse-modulation type which has the important advantages that it permits the transmitting equipment of the system to operate with high peak-power output greatly exceeding its average power-output capabilities, thus operating with high-power gain, and additionally permits a transpondor type of operation. In the latter mode of operation, the process by which direction is determined is initiated by an interrogating signal which is transmitted from the direction-indicating staton to the station which radiates the wave signals used in providing the direction indication. The interrogating signals when received by the latter station initiate and control its operation so that direction-indicating signals are radiated only when interrogating signals are received, thus minimizing possible interference with adjacent transmitting channels used for other purposes and increasing the element of secrecy which is of importance in military applications.

It is an object of the present invention to provide a new and improved direction-indicating system which is free of one or more of the above-mentioned disadvantages and limitations of prior systems of this type.

It is a further object of the invention to provide a new and improved direction-indicating system which possesses one or more of the desirable characteristics mentioned above.

It is an additional object of the invention to provide a new and improved direction-indicating system the operation of which is premised on average values of wave-signal travel differentials for effecting indications of direction and one which, therefore, is not affected either by any normal slow changes of intensities of received wave signals or rapid changes of intensity of relatively short duration.

In accordance with the invention, there is provided in a radiant-energy system of the type which effects translation of a modulation signal over at least two space paths extending between an antenna of one antenna system and individual antennas of another antenna system, a direction-indicating device for indicating with relation to a predetermined reference plane the direction of one of the antenna systems relative to the other. This device comprises means responsive to the modulation signals translated over the aforementioned space paths for developing a pair of signals having characteristics which vary similarly with time and a time relationship varying with the relative lengths of the space paths. The device includes means for differentially combining these developed signals to derive a control signal effectively of pulse wave form and having a pulse duration varying with the time relationship of the developed signals, and means responsive to the control signal for indicating the direction of one of the aforesaid antenna systems relative to the other.

For a better understanding of the present invention, together with other and further objects thereof, reference is had to the following description taken in connection with the accompanying drawings, and its scope will be pointed out in the appended claims.

Figure 2:
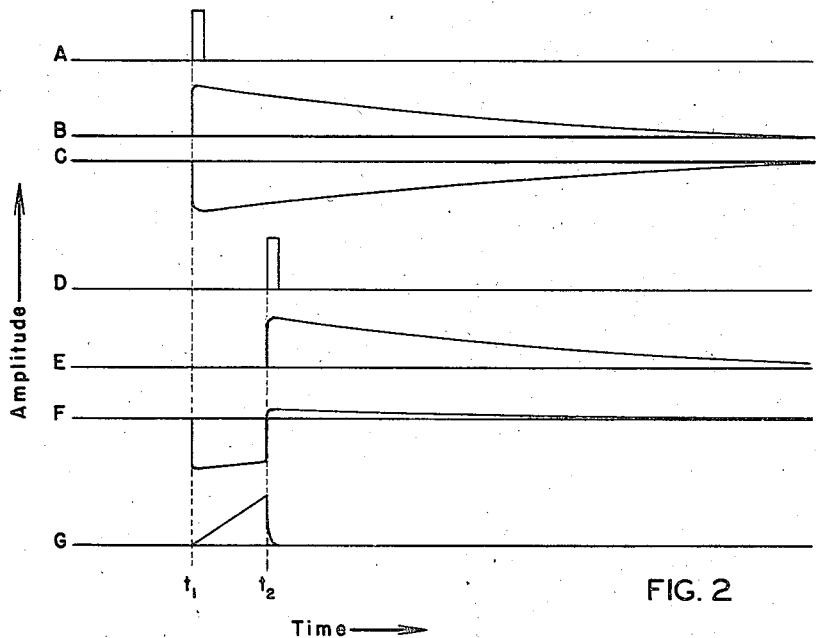
Figure 5:
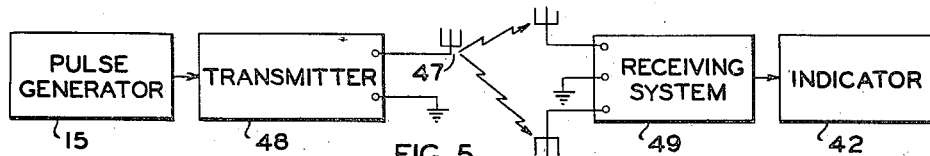
Figure 3:
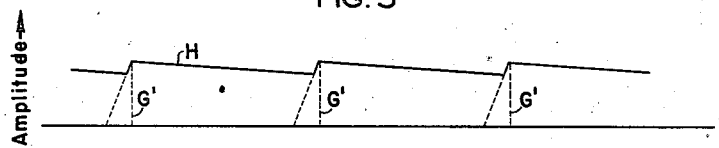
Figure 4:
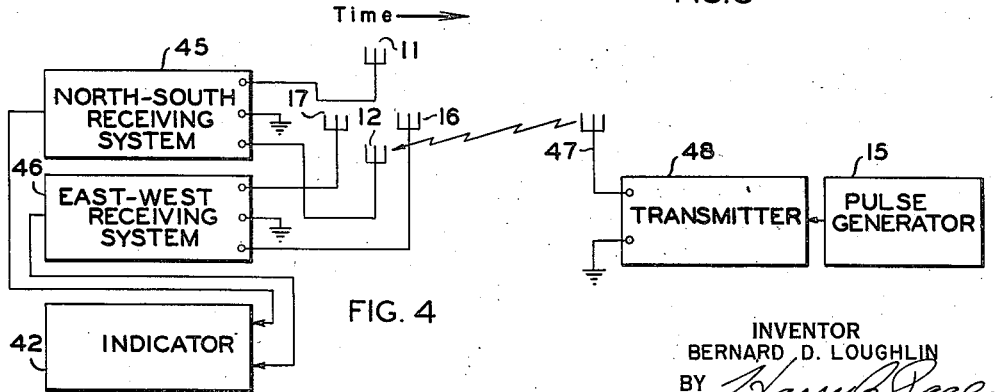

Referring now to the drawings, Fig. 1 is a circuit diagram, partly schematic, of a complete direction-indicating system embodying the present invention; Figs. 2 and 3 are curves used as an aid in explaining the operation of the invention; and Figs. 4 and 5 represent direction-indicating systems embodying modified forms of the invention.

Referring now more particularly to Fig. 1 of the drawings, there is represented a complete direction-indicating system embodying the present invention in a particular form suitable for providing an indication of direction with relation to a predetermined reference plane of longitude which is coincident with a fixed terrestrially positioned antenna system of the indicating system. This arrangement thus provides azimuthal indications. It will be understood, however, that the invention is not so limited and the reference plane may, if desired, be a horizontal one in which case the indications then involve the aspect of elevational direction. This system includes a pair of spaced antennas 11, 12 coupled to individual ones of a pair of transmitters 13, 14 for generating and transmitting individual ones of a pair of carrier-wave signals. Each of the transmitters 13, 14 includes a modulation input circuit coupled to an output circuit of a pulse generator 15, which generates a signal of periodic-pulse wave form. The system also includes a second pair of spaced antennas 16, 17 coupled to individual ones of a pair of transmitters 18, 19, which also have individual modulation input circuits coupled to an output circuit of generator 15. Antennas 11, 12, 16 and 17 are preferably located on a Cartesian system of coordinates, passing through the four cardinal points of the compass, and equidistant from the origin thereof. Transmitters 13, 14, 18 and 19 are of the pulse-modulated type and have individual carrier-wave frequencies. It will be understood that the elements 11–19, inclusive, are normally terrestrially located, and that the portion of the system presently to be described is normally associated with a craft the direction of which is to be determined and comprises a direction-indicating device for receiving the wave signals radiated from antennas 11, 12, 16 and 17 to indicate its direction with respect to these antennas. Since the antennas 11, 12, 16 and 17 are fixed and are spaced along axes having known azimuthal bearings, the course indications provided by the system become azimuthal indications and will be hereinafter referred to as such.

The direction-indicating device includes means for selectively receiving wave signals from antennas 11 and 12. This means is coupled to a receiving antenna system 20 and comprises two similar wave-signal translating channels, components of the second channel corresponding to analogous components of the first channel being designated by similar reference numerals primed. The first channel comprises in cascade, in the order named, a radio-frequency amplifier 21, an oscillator-modulator 22 for converting the received wave signals to intermediate-frequency signals, and an intermediate-frequency amplifier 23 which preferably includes at least one amplitude-limiter stage for limiting to a predetermined value the amplitude of the pulse-modulated wave signal translated by unit 23. The output circuit of unit 23 is coupled to an input circuit of a control-signal generator 24. The first channel, comprising units 21–23, inclusive, selectively receives and translates the wave signal of transmitter 13, while the second channel, comprising units 21'–23', inclusive, selectively receives and translates the wave signal of transmitter 14.

The unit 24 includes a pair of input transformers 25 and 25' having primary windings coupled to the output circuits of the respective amplifiers 23 and 23'. These transformers have secondary windings 26, 26' which are tuned by respective condensers 27 and 27' to provide frequency-selective circuits 26, 27 and 26', 27' resonant at the nominal intermediate frequencies of the respective amplifiers 23 and 23'.

The direction-indicating device also includes a pair of rectifier systems having individual load impedances for deriving across the latter the modulation components of the wave signals from antennas 11 and 12. One rectifier system comprises a diode rectifier 30 and a load resistor 31 therefor, these components being serially connected across the frequency-selective circuit 26, 27. The other rectifier system similarly comprises a diode rectifier 30' and a load resistor 31' which are serially connected across the frequency-selective circuit 26', 27'.

The device additionally includes energy-storage means coupled to individual ones of the load resistors 31, 31' and responsive to the derived modulation components of the received wave signals for developing a pair of signals having characteristics which vary similarly with time. This means comprises a pair of condensers 32, 32' individually connected in parallel with resistors 31, 31', respectively.

Means is provided for differentially combining the signals developed by condensers 32, 32' to derive a first control signal effectively of pulse wave form. This means comprises the control electrode and cathode elements of a pair of vacuum tubes 36 and 36'. The cathodes of these vacuum tubes are connected to ground, whereas their control electrodes are connected to individual terminals of the load impedances 31, 32 and 32', 32' of the respective diode rectifiers 30 and 30', these load impedances having a common terminal and the diode rectifiers being so poled that the potentials developed across the uncommon terminals of the load impedances have the same polarity. A grid-leak resistor 33 is connected between the control electrode and cathode of the vacuum tube 36 to serve as a common grid-leak resistor for both of the vacuum tubes 36 and 36'. It may be noted that this common grid-leak resistor may be connected between ground and any point on the circuit which includes the elements 31, 32, 31' and 32'.

The direction-indicating device additionally includes means responsive to this first control signal for indicating the azimuth of the indicating device relative to the antennas 11, 12. This means includes means for developing from this control signal a second control signal having a characteristic varying with the pulse duration of the first control signal. This last-mentioned means comprises a time-constant circuit including a condenser 37 connected across the output electrodes of tube 36, together with a resistor 38 of relatively large value connected between the anode of this tube and a source of energizing potential, indicated as +B, and a similar time-constant circuit including a condenser 37' connected across the output electrodes of tube 36' and a resistor 38' of relatively large value connected between the anode of the latter tube and the potential source +B.

The first control-signal responsive means also includes means for developing from the second control signal a third control signal having a characteristic varying with a characteristic of the second control signal. The last-named means comprises a pair of vacuum tubes 39, 39', having their control electrodes coupled to respective ones of the output circuits of tubes 36 and 36', and cathode-circuit time-constant networks including a condenser 40 and parallel-connected resistor 41 for the tube 39 and a condenser 40' and parallel-connected resistor 41' for the tube 39'. The anodes of tubes 39, 39' are energized from an anode-potential source, indicated as +B.

In order to provide for visual directional indications, the output circuit of control-signal generator 24 is coupled to the vertical beam-deflecting elements of a cathode-ray tube 42. Tube 42 is of a conventional type and is provided with suitable operating potentials, not shown for simplicity.

It will be seen that the units 21–23, inclusive, 21'–23', inclusive, and 24 are adapted to receive wave-signal energy from the north-south antennas 11—12, so that they may be referred to as the "north-south receiving system."

The direction-indicating device further includes an east-west receiving system 43, which has an input circuit coupled to the common receiving antenna 20. Receiving system 43, which includes circuit elements similar to those of the north-south receiving system, is adapted to receive and to translate to an associated control-signal generator 44 wave-signal energy from antennas 16, 17. Generator 44 comprises elements similar to those included in unit 24 and a similar circuit arrangement. The output circuit of generator 44 is coupled to the horizontal beam-deflecting elements of tube 42.

Considering now the operation of the indicating system just described, the wave signals of the transmitters 13, 14, 18 and 19 are simultaneously modulated by a signal of periodic-pulse wave form generated by the generator 15, thus to radiate pulse-modulated wave signals distinguishable in frequency. Assume that the direction-indicating device is in the north-east quadrant. The signals from transmitters 13 and 14, hereinafter referred to as the "north" and "south" signals, respectively, are selectively received by the respective radio-frequency amplifiers 21 and 21', converted into intermediate-frequency signals by the units 22 and 22', amplified at intermediate frequency by the amplifiers 23 and 23', and applied to the input-circuit transformers 25 and 25' of unit 24. It is assumed that the distance from the antennas 12, 11 to the indicating device is so great that the convergence of the paths of signal travel from antennas 12, 11 to antenna 20 may be neglected. Under the assumed conditions, the pulse-modulation components of the wave signals received from the north and south transmitters 13 and 14 have a relative time displacement at the time of reception given by the relation:

$$t = kd \sin a \qquad (1)$$

where $d$ is the distance between antennas 11 and 12,
$a$ is the angle formed by a line drawn from antenna 20 to the midpoint of the line between antennas 16 and 17, and
$k$ is a constant related to the wave-signal velocity and the units of measurement selected.

Similarly, the wave signals from transmitters 18 and 19 are received by the east-west receiving system 43 and applied to control-signal generator 44. The modulation components of these wave signals have a relative time displacement at the time of reception given by the relation:

$$t' = kd \cos a \qquad (2)$$

As will presently be explained in greater detail, the system has such operation that control signals are applied to cathode-ray tube 42 having values varying with the signal-time differentials $kd \sin a$ and $kd \cos a$, thus to provide direction indications through a 360-degree angle and without ambiguity.

The manner in which the control signals just mentioned are derived from the received wave-signal energy will now be considered in connection with the curves of Fig. 2 which represent the wave forms of voltages appearing at selected points in the direction-indicating device. Consider for the moment only the wave-signal modulation components corresponding to a single given pulse of the signal of generator 15. Under the conditions heretofore assumed, the wave-signal modulation components from the north transmitter 13 are the first ones to arrive at the direction-indicating device. These components are translated through receiver units 21–23, inclusive, to the signal generator 24. The received wave signal is of the pulse-modulation type and is preferably limited to a substantially constant amplitude by the amplitude-limiter stage or stages included in the amplifier 23, thus to reduce the effect of undesirable changes of received wave-signal intensity. The received wave signal is translated by the frequency-selective circuit 26, 27 and is applied to the diode rectifier 30 which derives the modulation components thereof. If the condenser 32 were disconnected from the load resistor 31, the derived pulse-modulation components would produce across the latter resistor at time $t_1$, Fig. 2, a potential pulse having the wave form represented by curve A of Fig. 2. With the condenser 32 connected across the resistor 31, however, the derived pulse rapidly charges the latter during the pulse interval. At the termination of the pulse, condenser 32 discharges slowly through the relatively large resistor 31 to develop thereacross a signal having an exponential portion, as represented by curve B.

This developed signal is applied between the control electrodes of tubes 36 and 36' and has positive polarity with respect to the control electrode of tube 36. The control electrode of tube 36 becomes conductive as soon as it is biased only slightly positive with respect to its cathode. Further, the potential drop between the control electrode and cathode of tube 36 then becomes so small that the control electrode cannot be biased more than a small fraction of a volt positive with relation to the cathode. Consequently, the control electrode of tube 36 is maintained at substantially ground potential, which is the potential of the cathode of this tube, during the application thereto of the signal developed across the condenser 32 so that the signal is applied with substantially full amplitude and negative polarity between thee control electrode and cathode of vacuum tube 36', as represented by curve C. In this regard, it should be noted that in the absence of any received wave-signal energy, the control electrodes of vacuum tubes 36 and 36' have substantially zero bias with respect to their associated cathodes and both of these tubes are fully conductive under this condition. The resistors 38 and 38' in the anode circuits of the latter have values sufficiently high that the potential drops produced across these resistors by the zero-bias space currents of tubes 36 and 36' are so large that only a small positive potential is actually applied to the anodes of these tubes. Consequently, the signal derived across the condenser 32 is not repeated with any substantial amplitude to the output circuit of the tube 36, due to the low anode potential of the latter, but is repeated to the output circuit of the tube 36' since it causes the control electrode of this tube to become more negative with relation to its associated cathode, thus reducing the space current of tube 36' and thereby tending to increase its anode potential. In practice, the amplitude of the signal developed across the condenser 32 preferably is sufficiently large that it causes the control electrode of vacuum tube 30' to bias the latter to or beyond anode current cutoff so that undesirable changes of amplitude of the signal, as might be caused by undesirable changes of received wave-signal intensity, are not effective to vary the amplitude of the signal developed in the output circuit of the tube 36'.

At some later time, for example at time $t_2$ of Fig. 2, the wave signal radiated by the antenna 12 of the south transmitter 14 is received by the indicating device; is translated through the receiver units 21'–23', inclusive; is limited to a substantially constant amplitude by the amplitude-limiter stage of the unit 23'; and is applied through the frequency-selective circuits 26', 27' to the diode rectifier 30' which derives the modulation components thereof. Were it not for the condenser 32', there would thus be developed across the resistor 31' a potential of pulse wave form, as represented by curve D of Fig. 2. The condenser 32', however, rapidly charges during the pulse and slowly discharges exponentially through resistor 31' at the termination of the pulse, thus to develop thereacross a signal, represented by curve E, having an exponential portion similar to that of the signal developed across the condenser 32 associated with the diode rectifier 30. The signal developed across the condenser 32' is applied between the control electrodes of vacuum tubes 36 and 36', but has a polarity opposite to that of the signal developed across the condenser 32 and thus one which tends to restore the potential of the control electrode of tube 36' to the same potential as its associated cathode. It will be apparent that the maximum value of the time interval $t_1-t_2$ occurs when the indicating device is either due south or due north of the antennas 11, 12. The decrease of amplitude of the signal developed across the condenser 32, due to the discharge of the latter through the resistor 31, is sufficiently small even during the longest possible interval $t_1-t_2$, last mentioned, that the signals developed across the condensers 32 and 32' have approximately equal amplitudes at time $t_2$. The signal developed across the condenser 32' thus effectively terminates the signal developed across the condenser 32 so that there is applied to the control electrode of tube 36' a potential or control signal of pulse wave form, represented by curve F, having a pulse duration varying with the time interval $t_1-t_2$. Expressed in another manner, the pulse duration of the control signal resulting from the differential combination of the signals developed across the condensers 32 and 32' has a value varying with $kd \sin a$.

The control signal applied to the control electrode of vacuum tube 36' renders the latter non-conductive during the pulse interval of the signal, thus tending to increase the anode potential of this tube as previously mentioned. The anode potential does not increase at once, however, since the charge of the condenser 37' must correspondingly increase and the latter can only charge through the resistor 38' of relatively large value. The circuit parameters are so selected that the time constant of the condenser 37' and resistor 38' is long compared to the pulse duration of the control signal applied to the control electrode of vacuum tube 36'. At the termination of a pulse of this control signal, condenser 37' discharges rapidly through vacuum tube 36' which, as previously explained, again becomes conductive at the termination of the pulse. There is thus developed across the condenser 37' a second control signal having positive polarity with respect to ground and having an approximately triangular-pulse wave form, as represented by curve G. This second control signal has an amplitude varying substantially only with the pulse duration of the first control signal applied to the control electrode of tube 36', and thus has an amplitude proportional to $kd \sin a$.

This second control signal is applied with positive polarity to the control electrode of tube 39'. The cathode resistor 41' of this tube has a relatively large value, of the order of one megohm, and the cathode condenser 40' a capacitance only large enough to provide therewith a time constant three or four times the period of the second control signal. The circuit parameters are thus so chosen that, under no-signal conditions, condenser 40' is charged to such a potential that the cathode of tube 39' is more positive than its control electrode by an amount almost sufficient to bias tube 39' to anode current cutoff. Upon the application of the second control signal, tube 39' becomes more conductive during the first several pulses thereof and condenser 40' receives an increment of charge to raise the cathode potential above the maximum amplitude of the second control signal by a value equal approximately to the anode current cutoff potential of tube 39'. As indicated by curve H of Fig. 3, the condenser 40' charges rapidly during each pulse G' of the second control signal and discharges relatively slowly through the cathode resistor 41'. A third unidirectional control signal thus is developed in the output or cathode circuit of tube 39', the magnitude of this control signal varying with the amplitude of the second control signal and thus being proportional to $kd \sin a$.

This third control signal is applied to the vertical deflecting electrodes of tube 42 to deflect the beam thereof in the vertical direction, indicated in Fig. 1, by an amount proportional to $kd \sin a$. It may be noted in passing that the polarity of this control signal, considered with relation to a selected one of the vertical deflecting electrodes of tube 42, is the same as long as the indicating device is positioned in either the north-east or north-west quadrants since corresponding modulation components of the wave signal of antenna 11 then always precede those of the wave signal of antenna 12.

Similarly, wave signals from antennas 16, 17 are received by the east-west receiving system 43 and applied to control-signal generator 44. Generator 44 derives the modulation components of the received wave signals and responds thereto to generate a control signal having a magnitude proportional to $kd \cos a$. This control signal is applied to the horizontal beam-deflecting electrodes of tube 42 to deflect the beam thereof in the horizontal direction as indicated in Fig. 1. It may again be noted in passing that the polarity of this control signal considered relative to the horizontal deflecting electrodes is the same whether the indicating device be in the northeast or south-east quadrants since corresponding modulation components of antenna 16 then precede those of antenna 17.

The two control signals thus applied to the deflecting electrodes of tube 42 simultaneously deflect the beam of the tube so that there appears on the screen thereof a luminous spot, the angular position of which indicates the direction of the indicating device with relation to the spaced antennas 11, 12, 16 and 17. The screen of tube 42 may therefore be calibrated in terms of direction.

It will be apparent from the foregoing description of the system operation that when the direction-indicating device is in the south-east quadrant with relation to the spaced antennas, the first modulation-signal components to arrive at the indicating device are those of the antenna 12. The first developed signal in point of time consequently is that produced by condenser 32'. The second signal derived in point of time is that across the condenser 32 and this signal is differentially combined with the first developed signal in the input circuit of tubes 36 and 36' to derive a control signal of negative polarity as applied to the control electrode of tube 36. Tube 36' does not repeat this signal, but tubes 36 and 39 and their associated circuits then function in similar manner to that previously described in connection with tubes 36' and 39' to develop a third control signal having, with relation to the vertical deflecting electrodes of tube 42, a polarity opposite to that developed under the conditions first assumed. This control signal thus produces a vertical component of deflection of the electron beam of tube 42 in a direction opposite to that hereinbefore described.

Further, it will now be apparent that when the indicating device is in a north-west or south-west quadrant, control-signal generator 44 is effective to produce a horizontal component of deflection of the beam of tube 42 in a horizontal direction opposite to that hereinbefore described.

The direction-indicating system has been described as including a plurality of transmitters 13, 14, 18 and 19 coupled to the antenna systems 11, 12, 16 and 17, these elements normally comprising a terrestrially located system, operating in conjunction with the direction-indicating device comprising elements 20–24, inclusive, 42, 43 and 44 normally carried by a craft the direction of which is to be indicated. It will be apparent, however, that an equally useful form of direction-indicating system embodying the invention is, as shown in Fig. 4, one in which the spaced antennas 11, 12, 16 and 17, terrestrially located, are coupled to individual ones of the input circuits of the plurality of wave-signal translating channels 45, 46 of the receiving system and in which the transmitting system is carried by the craft and includes a single nondirective antenna 47 coupled to a single transmitter 48 having an amplitude-modulation input circuit coupled to a pulse generator 15. In this form of indicating system, the transmitter operates at only one wave-signal frequency and the several wave-signal translating channels of the receiving system are tuned to receive wave signals of this frequency. Indications of the direction of the craft are here provided by the indicator 42 at the ground installation. An additionally modified form of this system, shown in Fig. 5, is one in which the single transmitter 48 is terrestrially located and the spaced antennas and receiving system 49 are carried by the craft, thus to provide a "homing" type of indicating system.

From the above description of the invention, it will be apparent that the direction-indicating system is of the radiant-energy type which effects translation of a modulation signal of periodic-pulse wave form over at least two space paths extending between an antenna of one antenna system and individual spaced antennas of another antenna system. Further, it will be apparent that the indicating device is responsive to the modulation signals translated over these space paths for developing a pair of signals having characteristics which vary similarly with time and which have a time relationship varying with the relative lengths of the space paths, thus to permit the differential combination of the developed signals to derive a control signal which is utilized in effecting the desired direction indication.

A direction-indicating device embodying the invention has the advantage that it is adapted for operation in a direction-indicating system of the pulse-modulation type and thus possesses all of the advantages characteristic of pulse-modulation operation; namely, the operation of transmitting equipment of the system with high power gain and the operation of the system as a whole as a transpondor type of system hereinbefore mentioned. An indicating device embodying the invention has the additional advantage that its operation is not detrimentally affected by relatively slow changes of received wave-signal intensity, such as might occur during conditions of severe atmospheric fading and the like. Nor is its operation affected by relatively rapid changes of received wave-signal intensity such as might occur by virtue of multiple paths of transmission or reception, or both in the transpondor type of operation, and to a rapid change in the character of such multiple paths due to relative movement of the indicating device and the transmitting equipment, as during the course of flight of an aircraft. The lack of sensitivity of the indicating device to relatively slow changes of received wave-signal intensity is due of course, to the limiting action provided by the units 23 and 23' and to the operation of tubes 36 and 36'. The lack of sensitivity of the indicating device to relatively rapid changes of wave-signal intensity is due to the long time constant of the elements 40, 41 and 40', 41' in the cathode circuits of the respective vacuum tubes 39 and 39' which are sufficiently long that the potentials developed thereacross vary only with the average values of amplitude of the control signal applied to the latter tubes.

While there have been described what are at present considered to be the preferred embodiments of this invention, it will be obvious to those skilled in the art that various changes and modifications may be made therein without departing from the invention, and it is, therefore aimed to cover all such changes and modifications as fall within the true spirit and scope of the invention.

What is claimed is:

1. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal effectively of pulse wave form and having a pulse duration varying with the time relationships of said developed signals, and means responsive to said control signal for indicating said direction.

2. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal of approximately rectangular-pulse wave form having a pulse duration varying with the time relationships of said developed signals, and means responsive to said control signal for indicating said direction.

3. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals of approximately saw-tooth wave form having amplitudes which vary similarly with time and having a time relationship varying with the relative lengths of said space paths, means for differentially combining said developed signals to derive a control signal effectively of pulse wave form and having a pulse duration varying with the time relationships of said developed signals, and means responsive to said control signal for indicating said direction.

4. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal effectively of pulse wave form and having a pulse duration varying with the time relationships of said developed signals, means for developing from said control signal a second control signal having a characteristic varying with the pulse duration of said first control signal, and means responsive to said second control signal for indicating said direction.

5. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal effectively of pulse wave form and having a pulse duration varying with the time relationships of said developed signals, means for developing from said control signal a second control signal having an amplitude varying with the pulse duration of said first control signal, and means responsive to the amplitude of said second control signal for indicating said direction.

6. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal effectively of pulse wave form and having a pulse duration varying with the time relationships of said developed signals, means for developing from said control signal a second control signal of approximately triangular-pulse wave form having a characteristic varying with the pulse duration of said first control signal, and means responsive to said second control signal for indicating said direction.

7. In a radiant-energy system of the type which effects translation of a modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the modulation signals translated over said space paths for developing a pair of signals having characteristics which vary similarly with time and a time relationship varying with the relative lengths of said space paths, means for differentially combining said developed signals to derive a control signal effectively of pulse wave form and having a pulse duration varying with the time relationships of said developed signals, means for developing from said control signal a second control signal having an amplitude varying with the pulse duration of said first control signal, means for developing from said second control signal a unidirectional control potential having a magnitude varying with the amplitude of said second control signal, and means responsive to said unidirectional potential for indicating said direction.

8. In an azimuth-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals and responsive to the modulation components thereof for developing a pair of signals having characteristics which vary similarly with time and a time relationship varying with the relative times of reception of the modulation components of said received wave signals, means for differentially combining said developed signals to derive a control signal effectively of pulse wave form having a pulse duration varying with the time relationships of said developed signals, and means responsive to said control signal for indicating the direction of said indicating device relative to said spaced antennas.

9. In a direction-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals and for deriving from the modulation components thereof a pair of signals having characteristics which vary similarly with time and a time relationship varying with the relative times of reception of the modulation components of said received wave signals, means for differentially combining said developed signals to derive a control signal effectively of pulse wave form having a pulse duration varying with the time relationships of said developed signals, and means responsive to said control signal for indicating the direction of said indicating device relative to said spaced antennas.

10. In a direction-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals and for deriving the modulation components thereof, means responsive to said derived modulation components for developing a pair of signals having characteristics which vary similarly with time and a time relationship varying with the relative times of reception of the modulation components of said received wave signals, means for differentially combining said developed signals to derive a control signal effectively of pulse-wave form having a pulse duration varying with the time relationships of said developed signals, and means responsive to said control signal for indicating the direction of said indicating device relative to said spaced antennas.

11. In a direction-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals and for deriving the modulation components thereof, energy-storage means responsive to said derived modulation components for developing a pair of signals of approximately sawtooth wave form having amplitudes which vary similarly with time and a time relationship varying with the relative times of reception of the modulation components of said received wave signals, means for differentially combining said developed signals to derive a control signal effectively of pulse wave form having a pulse duration varying with the time relationships of said developed signals, and means responsive to said control signal for indicating the direction of said indicating device relative to said spaced antennas.

12. In a direction-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals, a pair of rectifier systems including individual load impedances for deriving across said load impedances the modulation components of individual ones of said wave signals, a pair of energy-storage devices coupled to individual ones of said load impedances for deriving from said modulation components a pair of signals having characteristics which vary similarly with time and a time relationship varying with the relative times of reception of the modulation components of said received wave signals, means for differentially combining said developed signals to derive a control signal effectively of pulse wave form having a pulse duration varying with the time relationships of said developed signals, and means responsive to said control signal for indicating the direction of said indicating device relative to said spaced antennas.

13. In a direction-indicating system of the type including at least one transmitter and a pair of spaced antennas for transmitting individual ones of a pair of wave signals modulated by individual modulation signals having a determinable time relation therebetween, a direction-indicating device for receiving said wave signals to indicate with relation to a predetermined reference plane its direction with respect to said antennas comprising, means for selectively receiving said wave signals and responsive to the modulation components thereof for developing a pair of signals having characteristics which vary similarly with time and a time relationship varying with the relative times of reception of the modulation components of said received wave signals, said means including a pair of serially-connected output circuits to which individual ones of said developed signals are applied, a pair of vacuum tubes having input electrodes all coupled in series relation across said output circuits to derive by differential combination of said developed signals a control signal effectively of pulse wave form having a pulse duration varying with the time relationships of said developed signals, and means responsive to said control signal for indicating the direction of said indicating device relative to said spaced antennas.

BERNARD D. LOUGHLIN.